Figure 1:
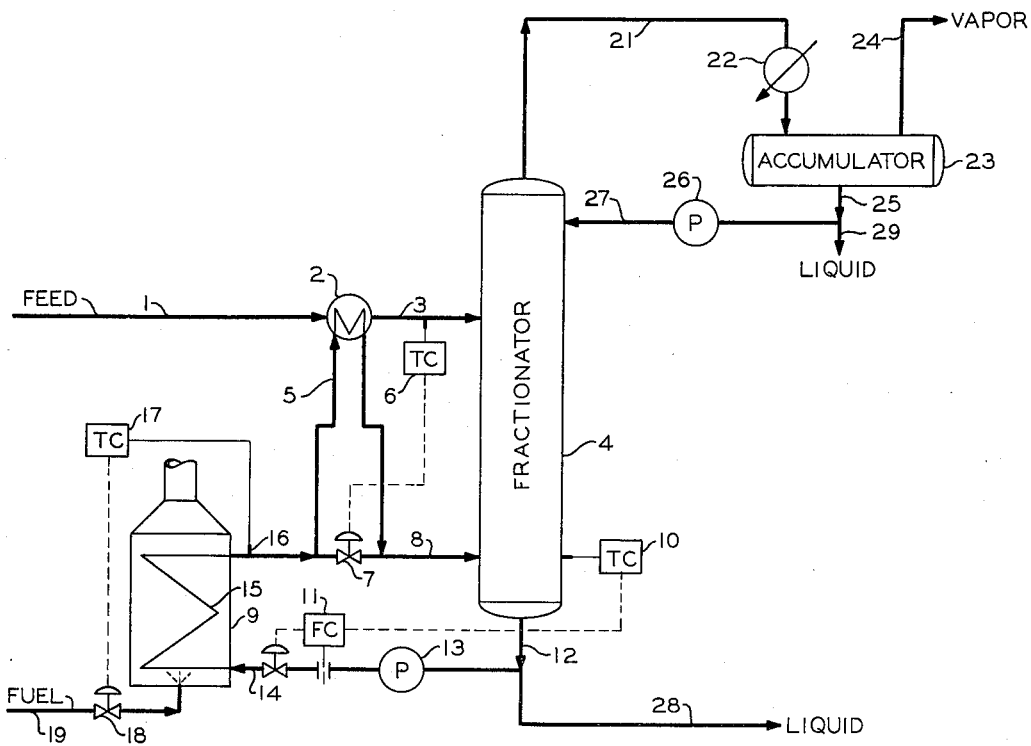

May 3, 1966     J. T. CABBAGE ETAL     3,249,519
AUTOMATIC CONTROLS IN A FRACTIONATION COLUMN
Filed Feb. 27, 1962

INVENTORS.
J. T. CABBAGE
JOE VAN POOL
BY
*Young & Quigg*
ATTORNEYS

United States Patent Office 3,249,519
Patented May 3, 1966

3,249,519
AUTOMATIC CONTROLS IN A FRACTIONATING COLUMN
John T. Cabbage and Joe Van Pool, Bartlesville, Okla., assignors to Phillips Petroleum Company, a corporation of Delaware
Filed Feb. 27, 1962, Ser. No. 176,040
14 Claims. (Cl. 203—2)

This invention relates to a method and apparatus for fractionating a fluid. In one of its aspects, it relates to a method wherein feed to a fractionating zone is heat interchanged with bottoms thereof which are reboiled to a constant temperature and in an amount sufficient to maintain the tower bottoms in the tower at a constant predetermined temperature, the amount of heat interchange being controlled responsive to the temperature of the feed to the tower or a temperature condition in the tower sensed substantially above the liquid bottoms in the fractionating zone. In another of its aspects, the invention relates to a method essentially as just described wherein the amount of reboiled bottoms which is heat interchanged with the feed is controlled responsive to a pressure differential in the fractionating means, in one embodiment a ratio of pressure differential of a section above and a section below the entry of the feed being used for purposes of the control. In a further aspect of the invention, it relates to apparatus for continuous and automatic operation of a fractionation means substantially as set forth herein, comprising in combination means for fractionating, means for externally reboiling bottoms from the means for fractionating to a constant temperature and in an amount controlled responsive to the temperature of the bottoms in said means for fractionating, and heat interchanging the feed with at least a portion of reboiled bottoms responsive to a condition sensed in the means for fractionating.

The fractionation of fluids is well known and has been extensively developed over the years. However, there is considerable room for improvement as evidenced by research work now underway to improve not only the overall operation but the manner of effecting the same with controls which can be automatically operated. The objective of fractionation as is known to one skilled in the art is to obtain products of desired purity with least expense and equipment.

It is known to heat interchange certain streams with certain other streams in a fractionation operation.

It has now occurred to us to operate a fractionation by externally reboiling the bottoms to a constant temperature by passing the bottoms through a heating means from which the bottoms emanate at a constant temperature but in an amount responsive to the temperature of the bottoms in the fractionation zone or means, and to by-pass at least a portion of the bottoms returning to the fractionation means into heat interchange with the feed to the fractionation operation or means responsive to a condition sensed in the fractionation means located substantially away from the bottoms in said means, for example, responsive to the temperature of the feed approximately at the locus at which it enters into the fractionator or responsive to a difference of pressure between at least two points in said fractionation zone or means, more specifically responsive to a difference in pressure between two points located above the feed, and still more specifically responsive to the ratio of the pressure differential across a section located above and a section located below the place at which the feed is distributed into the fractionation zone or means. In a more specific concept we control the reflux responsive to an analysis of its composition, thereby achieving completely automatic operation.

It is an object of this invention to provide a method for fractionating a fluid. It is another object of this invention to provide an apparatus for fractionating a fluid. It is a still further object of this invention to provide method and apparatus for automatically controlling the fractionation of a fluid. It is a still further object of this invention to provide method and means for controlling the fractionation of a fluid wherein a liquid stream is reboiled and the feed is preheated by indirect heat exchange therewith. It is still a further object of this invention to provide flexibility, in a fractionation operation, for shifting heat addition between feed and tower bottoms so that a smaller fractionator can be utilized for a given operation.

Other aspects, objects, and the several advantages of this invention will become apparent from a study of this disclosure, drawing, and the appended claims to the invention.

According to the present invention there are provided method and apparatus for fractionating a fluid wherein a constant temperature of liquid product removed from a fractionation zone is maintained by externally heating said liquid product to a predetermined temperature in a quantity sufficient to maintain the liquid product in the fractionation zone at a constant temperature and passing a controlled variable amount of the liquid product preheated to a temperature as described into heat interchange with the feed responsive to a condition sensed in the fractionation zone at a place substantially removed from the place at which the liquid product is removed from said zone.

According to one form of the invention, the condition which is sensed is the temperature at the place at which the feed enters the fractionation zone. In another form of the invention the condition is a pressure differential taken across a substantial section of the zone substantially removed from the place at which the liquid product is contained therein. In a still further form of the invention the temperature which is sensed can be located at any desired place in the fractionation zone so long as it is substantially removed from the place at which the liquid product is contained therein and the pressure differential can be across a section located either above or below the point of entry of the feed or a section which extends across the point of entry of the feed or in the now preferred embodiment or form can be a ratio of the differential of pressure across a substantial section of the fractionation zone located above and a substantial section of the fractionation zone located below the point of entry of the feed.

Figure 2:
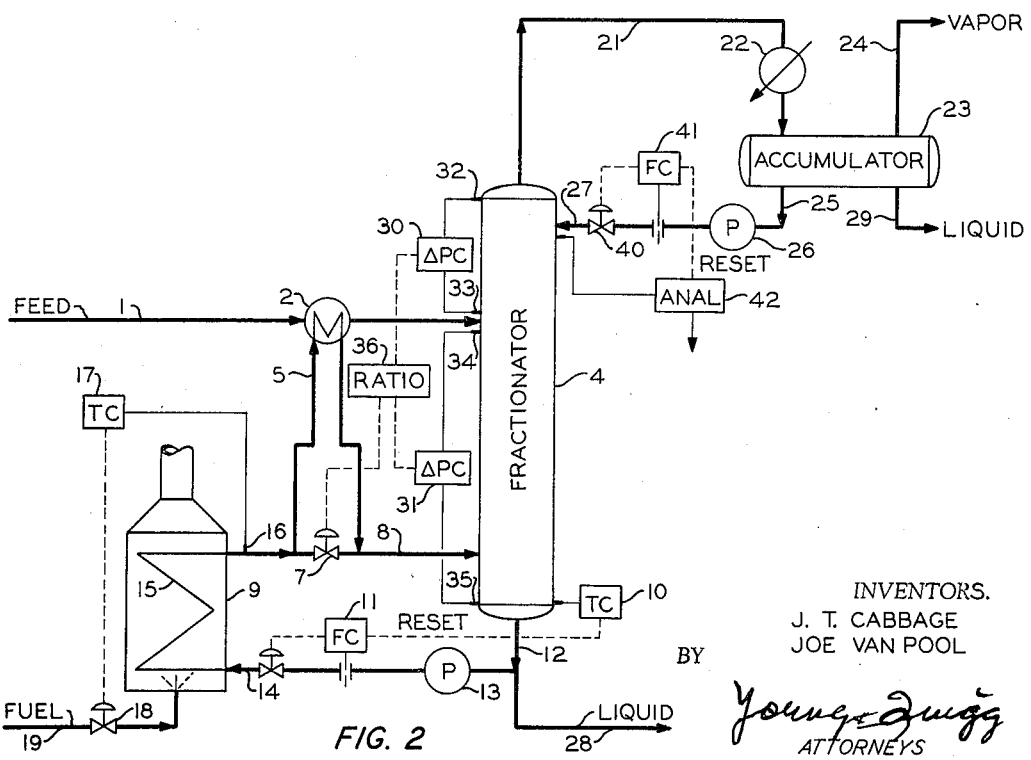

Referring to the drawings, FIGURE 1 shows an embodiment of the invention in which the temperature of the feed is used to control the amount of reboil liquid bottoms passed into heat interchange therewith. FIGURE 2 shows an embodiment in which the amount of reboiled bottoms passed into heat interchange with the feed is controlled responsive to the ratio of the pressure differential taken across a substantial portion of the fractionator located above and a substantial portion of the fractionator located below the point of entry of the feed.

Referring now to FIGURE 1 and by way of specific example of the invention a feed 1 passes through heat interchanger 2 and by way of 3 into fractionator 4. The feed contains a hydrodesulfurized naphtha fraction from a desulfurizer flash tank. This naphtha contains hydrogen, hydrogen sulfide, and a small amount of $C_1$-$C_4$ hydrocarbons which must be removed by fractionation. A conventional reboiled fractionator designed to remove the small amount of hydrogen and the small amount of $C_1$-$C_4$ hydrocarbons would have an extremely heavy load at the bottom of the tower but a very small load at the top. As will be seen, the present operation, as now to be described, and the operation of FIGURE 2, later described, permits considerably reducing the load on the bottom section of the fractionator, thus making it possible to use a smaller tower to do a given job.

Thus, 230 barrels per hour of the feed at 200° F. passes into heat interchanger 2 in which it is heated to 350° F. by passing reboiled bottoms by way of 5 into exchanger 2. The quantity of reboiled bottoms passed by way of 5 into exchanger 2 is controlled responsive to temperature controller 6 which controls the operation of valve 7 in 8 which returns reboiled bottoms from heater 9 to fractionator 4. The bottoms from fractionator 4 are maintained at 495° F. by means of temperature controller 10 which controls flow controller 11 which in turn controls the flow of bottoms by 12, pump 13, and 14 into heating coil 15 in heater 9. In heater 9 heat supplied to coil 15 is controlled responsive to the outlet temperature at 16 by means of temperature controller 17 and valve 18 in fuel line 19. Thus, 683 barrels per hour at 495° F. are passed by 12, pump 13, and 14 to coil 15. The outlet temperature of coil 15 being controlled as described and valve 7 being controlled as described a variable portion of reboiled bottoms is passed by 5 at 530° F. into exchanger 2 from which it is returned to fractionator 4 by way of 8. In this embodiment vaporous overhead 21 at 112° F. which contains hydrogen, hydrogen sulfide and light hydrocarbon gases is cooled and condensed in cooler-condenser 22 and accumulated in accumulator 23 from which gas is taken off by 24. A portion of the gas which is maintained condensed in 23 is passed by 25, pump 26 and 27 to fractionator 4 as reflux. Controls on this operation can be conventional. Bottoms yield of 223 barrels per hour is obtained at 28 while gas yield of 13,200 standard cubic feet per day or the equivalent of 7 barrels per hour is obtained at 24. Liquid (none yielded in this example) not used as reflux is removed by 29. In this embodiment the heater has a 10 million B.t.u. per hour duty capacity.

Referring now to FIGURE 2, in which like numbers indicate like parts of FIGURE 1, differential pressure controllers 30 and 31 sense the pressure at points 32 and 33 and at points 34 and 35, respectively, and these pressure differentials are ratioed at 36 to provide a signal to control valve 7.

Valve 40, controlled by flow controller 41 which is reset by analyzer 42, controls the amount of reflux passing by 27 to tower 4. Analyzer 42 analyzes, in this embodiment, the composition of the liquid in the tower on the tray just below the entry of the reflux.

It will be obvious to one skilled in the art having studied this disclosure carefully that this invention provides a control system for fractionation for automatic adjustment of feed and bottoms heat to give even distribution of tower load above and below the feed and to produce one specification fractionator effluent product.

Thus, there is provided an automatic system for fractionation wherein a portion of the reboiled bottoms is indirectly heat exchanged with the fractionator charge to control the heat inputs, i.e., feed pre-heat and reboil heat for optimum tower operation. Further, the invention is particularly advantageously applied, as indicated, to fractionation of a feed material in which the major portion is a high boiling point material and wherein additional heating of the feed produced is a relatively small increase in the vapor content of the feed.

In a fractionation operation of the type herein described a considerable percentage of the heat required goes to increasing the temperature of the bottoms product to its bubble point and a relatively small percentage of the heat, compared to normal fractionation operations, is transmitted up the tower past the feed plate. It follows that the major load on a column in the type of operation here considered is at the bottom. Thus, for a given fractionator size, the present invention allows flexibility to shift part of the heat addition from the bottom to the feed, thus unloading the bottom section, and correspondingly increasing the capacity of the equipment. Thus with an operation or apparatus according to the present invention a smaller size fractionator will accomplish the same end or a given size fractionator will operate with a greater range of heat content variation in the feed stream.

Thus, according to the invention, in a broad aspect thereof, the liquid bottoms of a fractionation zone are circulated through a heating zone, at a rate controlled by the temperature of said bottoms in said zone, and heated to a constant heating zone outlet temperature and a portion of the thus-heated bottoms are heat-exchanged with the feed to the fractionation zone, the portion thus heat-exchanged with the feed being controlled responsive to a condition at a locus in said fractionation zone. Herein and in the claims, it is intended that the term "locus" include any one or more points in the operation or apparatus in the fractionation zone or means, or immediately adjacent thereto, which one skilled in the art will recognize, having read this disclosure, as a place at which can be positioned sensing zones or means to sense a condition or conditions, in said fractionation zone.

Reasonable variation and modification are possible within the scope of the foregoing disclosure, the drawings, and the appended claims to the invention the essence of which is that there have been provided method and means for automatically fractionating a fluid, particularly a fluid containing a relatively small amount of light ends, which comprises reboiling the bottoms of a fractionator to a constant temperature in an amount sufficient to maintain said constant temperature by externally heating said bottoms to a predetermined heating temperature and passing a variable portion of heated bottoms into heat interchange with the feed responsive to a condition in the fractionator substantially as set forth and described herein.

We claim:

1. A method of operating and controlling a fractionation zone which is especially adapted to an operation in which the zone yields a preponderant proportion of feed thereto as bottoms, while taking overhead a smaller proportion of light material which comprises feeding material to be fractionated to a mid-section of a substantially vertically disposed elongated fractionation zone, removing a vaporous product at the top of said zone, removing a liquid product from the bottom of said zone, passing said liquid product into, through, and from a heating zone external of said fractionation zone, and back to the bottom of said fractionation zone, controlling heat input to said heating zone to maintain constant the temperature of liquid product emanating from said heating zone, controlling the rate of flow of said liquid product from the bottom of said fractionation zone to said heating zone and back to said fractionation zone bottom responsive to the temperature of said liquid product in the bottom of said fractionation zone to maintain said liquid product at a predetermined desired temperature, heat exchanging said material being fed to said fractionation zone with a flow of a variable portion of the liquid product emanating from said heating zone, and controlling the flow of said variable portion of the liquid product responsive to a condition of said fractionation zone at a predetermined locus thereof located substantially above the bottom of said zone.

2. A method of operating and controlling a fractionation zone which is especially adapted to an operation in which the zone yields a preponderant proportion of feed thereto as bottoms, while taking overhead a smaller proportion of light material which comprises feeding material to be fractionated to a mid-section of said zone, removing a vaporous overhead product at one end of said zone, removing a liquid product from another end of said zone, passing said liquid product into, through, and from a heating zone and back to said another end of said fractionation zone, controlling heat input to said heating zone to maintain constant the temperature of liquid product emanating from said heating zone, controlling the rate of flow of said liquid product from said fractionation zone to said heating zone and back to said fractionation zone responsive to the temperature of said liquid product in said another end of said fractionation zone to maintain said liquid product at a predetermined desired temperature, heat exchanging said material being fed to said fractionation zone with a flow of a variable portion of the liquid product emanating from said heating zone, and controlling the flow of said variable portion of the liquid product responsive to a condition of said fractionation zone at a predetermined locus thereof.

3. A method according to claim 2 wherein the condition of said fractionation zone is at least one temperature in said fractionation zone sensed substantially above said liquid product in said another end thereof.

4. A method according to claim 2 wherein the condition of said fractionation zone is the temperature of the feed at the place at which it is fed to said fractionation zone.

5. A method according to claim 2 wherein said condition is the pressure differential across a section of said fractionation zone.

6. A method according to claim 2 wherein the condition is the pressure differential across a section of said fractionation zone above the entry of the feed to said zone.

7. A method according to claim 2 wherein the condition is determined by obtaining a signal representative of the ratio of the pressure differential across a substantial section of the fractionation zone above and of a substantial section of the fractionation zone below the locus at which the feed arrives into the fractionation zone.

8. A method according to claim 2 wherein the overhead is removed, condensed, and a portion is returned as reflux responsive to analyses of the reflux to maintain the same at a constant predetermined composition.

9. An apparatus comprising in combination means for fractionating a fluid, means for introducing a fluid to be fractionated to a mid-section of said means for fractionating, means for removing a vapor from said means for fractionating, means for withdrawing a liquid from a low portion of said means for fractionating, means for heating said fluid located externally of said means for fractionating, means for passing said liquid from said means for fractionating to said means for heating at a rate responsive to the temperature of said liquid in said means for fractionating means upon said means for heating for controllably heating liquid therein to a predetermined constant temperature, means for returning heated liquid to said means for fractionating, means for heat interchanging the fluid fed to said means for fractionating, means for passing at least a portion of liquid heated in said heating means into said means for heat interchanging the fluid fed to said fractionating means, means for controlling said portion responsive to a temperature sensed in said tower substantially above the bottom which contains liquid in operation.

10. An apparatus comprising in combination means for fractionating a fluid, means for introducing a fluid to be fractionated to a mid-section of said means for fractionating, means for withdrawing a liquid from a low portion of said means for fractionating, means for heating said fluid located externally of said means for fractionating, means for passing said liquid from said means for fractionating to said means for heating at a rate responsive to the temperature of said liquid in said means for fractionating, means upon said means for heating to provide for heating liquid therein to a predetermined constant temperature, means for returning heated liquid to said means for fractionating, means for heat interchanging the fluid fed to said means for fractionating, means for passing at least a portion of liquid heated in said heating means into said means for heat interchanging the fluid fed to said fractionating means, and means for controlling said portion responsive to the temperature of said fluid as it is fed to said fractionating means; and means for taking an overhead vapor from said means for fractionating.

11. An apparatus comprising in combination means for fractionating a fluid, means for introducing a fluid to be fractionated to a mid-section of said means for fractionating, means for removing a vapor from said means for fractionating, means for withdrawing a liquid from a low portion of said means for fractionating, means for heating said fluid located externally of said means for fractionating, means for passing said liquid from said means for fractionating to said means for heating at a rate responsive to the temperature of said liquid in said means for fractionating, means upon said means for heating for controllably heating liquid therein to a predetermined constant temperature, means for returning heated liquid to said means for fractionating, means for heat interchanging the fluid fed to said means for fractionating, means for passing at least a portion of liquid heated in said heating means into said means for heat interchanging the fluid fed to said fractionating means, and means for controlling said portion responsive to a condition of the fluid being fractionated in said fractionation means.

12. An apparatus according to claim 11 wherein means are provided upon said means for fractionating for condensing vapor removed therefrom and means are also provided for returning at least a portion of the thus-obtained condensate responsive to the composition thereof.

13. An apparatus comprising in combination means for fractionating a fluid, means for introducing a fluid to be fractionated to a mid-section of said means for fractionating means for removing a vapor from said means for fractionating, means for withdrawing a liquid from a low portion of said means for fractionating, means for heating said fluid located externally of said means for fractionating, means for passing said liquid from said means for fractionating to said means for heating at a rate responsive to the temperature of said liquid in said means for fractionating, means upon said means for heating for controllably heating liquid therein to a predetermined constant temperature, means for returning heated liquid to said means for fractionating, means for heat interchanging the fluid fed to said means for fractionating, means for passing at least a portion of liquid heated in said heating means into said means for heat interchanging the fluid fed to said fractionating means, means for controlling said portion responsive to a pressure differential across a section of said fractionation means taken above the liquid in the bottom thereof.

14. An apparatus according to claim 13 wherein the means for controlling said portion is responsive to means upon said fractionation means yielding a ratio of the pressure differential of a section in said fractionation means above the place at which the feed enters thereto and the pressure differential across a section of said fractionation means below the place at which feed enters thereto but above the bottom thereof containing liquid.

References Cited by the Examiner
UNITED STATES PATENTS

| | | | |
|---|---|---|---|
| 2,276,089 | 3/1942 | Ragatz | 202—206 X |
| 2,277,070 | 3/1942 | Carney | 202—160 X |
| 2,509,136 | 5/1950 | Cornell | 202—160 X |
| 2,882,693 | 4/1959 | Clay | 202—160 |
| 2,933,900 | 4/1960 | Hanthorn | 202—160 |
| 2,990,437 | 6/1961 | Berger | 202—160 |
| 2,994,646 | 8/1961 | Kleiss | 196—132 |
| 3,004,089 | 10/1961 | Hutto | 196—132 |
| 3,066,175 | 11/1962 | Bauer et al. | 196—132 |

FOREIGN PATENTS 740,014  10/1943  Germany.

OTHER REFERENCES

Industrial and Engineering Chemistry, Lupfer et al., vol. 53, No. 12, December 1961 (pages 963–969).

NORMAN YUDKOFF, *Primary Examiner.*

W. L. BASCOMB, *Assistant Examiner.*